United States Patent [19]
Bowerman et al.

[11] Patent Number: 5,655,987
[45] Date of Patent: Aug. 12, 1997

[54] ROLL-FORMED DIFFERENTIAL GEAR

[75] Inventors: Ward E. Bowerman; Charles T. D'Agostino, both of Rochester, N.Y.

[73] Assignee: Zexel Torsen Inc., Rochester, N.Y.

[21] Appl. No.: 492,704

[22] Filed: Jun. 20, 1995

[51] Int. Cl.$^6$ ............................ F16H 48/06; F16H 55/06
[52] U.S. Cl. ........................ 475/248; 475/252; 74/462
[58] Field of Search ................ 72/69, 105; 29/893.32, 29/893.33; 74/462; 475/248–252

[56] References Cited

U.S. PATENT DOCUMENTS

| | | | |
|---|---|---|---|
| 3,362,059 | 1/1968 | Ponio et al. | 72/105 |
| 3,531,976 | 10/1970 | Fuhrman | 29/893.32 X |
| 3,626,733 | 12/1971 | Zook et al. | 72/104 |
| 3,887,979 | 6/1975 | Kamiya | 29/893.32 |
| 4,942,781 | 7/1990 | Hori | 74/462 X |
| 5,182,937 | 2/1993 | Dickson | 72/469 |
| 5,232,416 | 8/1993 | Amborn et al. | 475/252 |
| 5,310,389 | 5/1994 | Sato | 475/252 |
| 5,507,703 | 4/1996 | Madsack et al. | 475/248 |

Primary Examiner—Khoi Q. Ta
Attorney, Agent, or Firm—Eugene Stephens & Associates

[57] ABSTRACT

A gear for use in automotive differentials and a method for its manufacture in which, initially, the gear teeth are roll-formed in a cylindrical rod workpiece between a pair of toothed dies so that a fissure is created in the top land of each rolled tooth, the roll-forming being continued until (a) the diameter of the top land of each tooth is slightly greater than the desired cylindrical outside diameter of said gear and (b) each fissure is narrowed to form a seam at the top land surface of each tooth. The gears are then further processed in a relatively short machining operation that removes the narrowed seam in the top land of each gear tooth to reduce the depth of the fissure so that the normal force vector of the highest point single tooth loading ("HPSTL") on the gear tooth is directed below the bottom of the fissure. Preferably, this same finishing operation re-opens the fissure and forms the cylindrical journal/top lands of the gear teeth to a finished outside diameter slightly smaller than the inside diameter of the cylindrical differential housing pocket into which the gear will be received and supported.

10 Claims, 4 Drawing Sheets

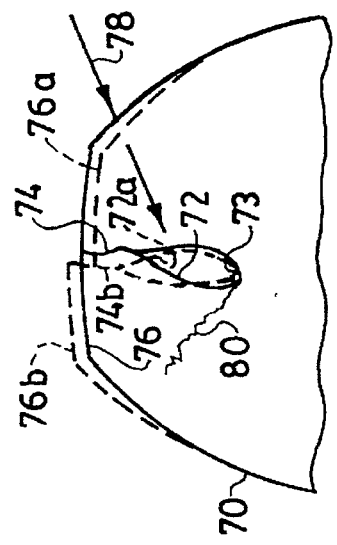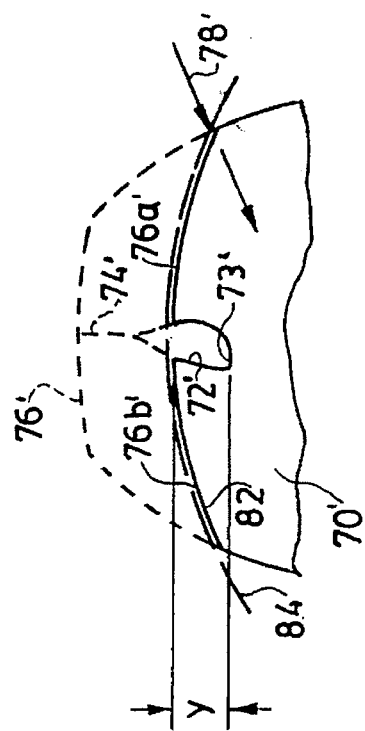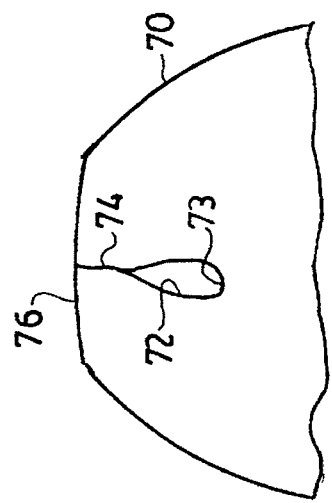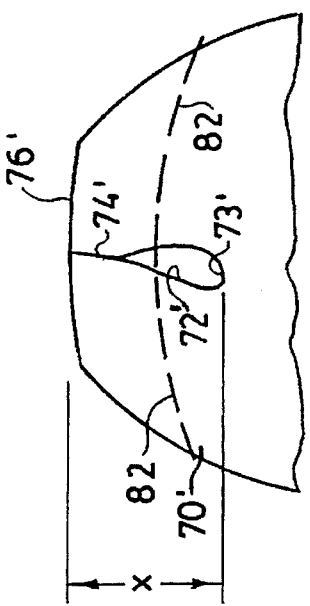

ROLL-FORMED DIFFERENTIAL GEAR

TECHNICAL FIELD

The invention relates to gears for specific use in automotive differentials and to the roll-forming manufacture of such gears.

BACKGROUND OF INVENTION

Gears are manufactured by several different machining methods, e.g., cutting, grinding, forging, rolling, etc. In recent decades roll-forming processes have been used in the manufacture of helical-tooth gears from cylindrical rod workpieces. In these well-known rolling processes, the toothed articles are formed by the relative motion of sets of dies which themselves have helical teeth that not only displace the metal on the surface of the rods but also pull the rod through the dies during the forming process. Some processes use a pair of flat dies that are reciprocated relative to each other, while others use sets of large cylindrical dies that roll in the same direction, squeezing the workpiece rod between them to form mating teeth on the surface of the rod as the rod rotates between them like a planetary gear.

It is also well-known that such prior art rolling systems create a fissure and seam at the crest of the rolled tooth because the metal of the workpiece is squeezed radially outward faster along the tooth faces of the die teeth than it is moved outwardly in the spaces between the die teeth. This creates two peaks of work material at the roots of each pair of die teeth (i.e., at the top land of the formed tooth); and in the final stages of most of these roll-forming operations, these peaks fold over to form a seam in the top land of each rolled tooth. Such seams are usually displaced slightly from the center of the top land and are inclined due to the direction of tooth sliding during the roll-forming operation.

The resulting seam often causes the outside cylindrical circumference of the gears to be uneven, and it also creates a potential weak spot that can cause a failure of the formed tooth under certain types of heavy loading. Because of these just-recited problems, roll-formed gears have not been considered appropriate for use in automotive differentials.

In modern automotive differentials, the spur and helical gears are configured to provide maximum tooth strength in minimum space, and the design of the meshing gears utilizes the full addendum of each tooth. That is, the highest point single tooth loading ("HPSTL") on each gear tooth usually occurs at the top of its addendum (i.e., at its intersection with the top land of the tooth). Such HPSTL stress, supported by the seamed top lands of roll-formed teeth, greatly increases the chance of tooth failure, as is explained in greater detail below.

Further, parallel-axis gear differentials often support the gears in housing pockets. In such arrangements, the top lands of the gears act as journals, and the cylindrical inside diameters of the differential housing pockets act as the bearing surfaces for the cylindrical outside diameter of the gears. Any unevenness (or any departure from desired cylindrical form) in the top lands of the roll-formed gears can result in point contact between the outside diameter of the gears and the cylindrical bearing surface of the differential pocket, causing undesirable wear and noise.

Therefore, it has been long assumed that roll-formed gears could not be safely incorporated in differentials. In other words, roll-formed gears have been heretofore considered inappropriate for use in differentials.

Our invention is directed to the solution of these problems and to facilitating the use of an economical roll-forming process in the manufacture of spur and helical gears for automotive differentials, particularly for parallel-axis differentials in which the gears are supported in cylindrical pockets.

SUMMARY OF THE INVENTION

We have found a method of manufacture that permits effective use of roll-formed gears in automotive differentials, particularly in parallel-axis differentials in which the gears are supported for rotation within the cylindrical inside diameters of housing pockets. According to our invention, the teeth of the gears are initially roll-formed in a cylindrical rod workpiece between a pair of toothed dies so that a fissure is created in the top land of each rolled tooth and so that the diameter of the top land of each tooth is slightly greater than the cylindrical outside diameter desired for the gear. Also, the roll-forming process is continued until the fissure is narrowed to form a seam at the top land surface of each tooth. The gears are then further processed in a relatively short machining operation that removes the narrowed seam in the top land of each gear tooth and re-contours the top land so that the normal force vector of the HPSTL is directed below the fissure and a primary cause of stress failure is obviated. Preferably, this same finishing operation re-opens the fissure and forms the top lands of the gear teeth with a cylindrical outside diameter appropriate to act as a journal for the gear.

Preferably, centerless grinding is used for this finishing operation which removes a thin layer of top land, e.g., to a depth equivalent to approximately one-half of the total depth of the fissure. This removal of the narrowed seam greatly reduces the possibility of stress cracks developing in the top land of the tooth due to relative movement of the top land along a fault line represented by the narrowed seam; and, in the event that some relative movement develops in one side of the top land in response to tip loading, the modification of the top land in accordance with the invention prevents crack generation by permitting undesirable tip-load stress to be partially absorbed by the re-opened fissure. Preferably, this same finishing operation is used to minimize uneven stress points by finish forming the cylindrical journal/top lands of the gear teeth to an outside diameter approximately equivalent to (i.e., only slightly smaller than) the inside diameter of the cylindrical differential pocket into which the gear will be received and supported.

DRAWINGS

FIGS. 4A and 4B are schematic illustrations, with elements in greatly exaggerated dimensions and not in relative scale, of the fissure and narrowed seam created beneath the top land surface of a roll-formed gear tooth, FIG. 4A showing the tooth top land as roll-formed, and FIG. 4B showing the tooth top land stressed under load.

FIGS. 5A and 5B are further schematic illustrations, with elements in greatly exaggerated dimensions and not in relative scale, of the fissure and narrowed seam created in the top land surface of a roll-formed gear tooth, FIG. 5A showing the tooth top land as roll-formed in accordance with the invention, and FIG. 5B showing the tooth top land after the finish grind operation of the invention.

DETAILED DESCRIPTION OF PREFERRED EMBODIMENTS

Figure 1:
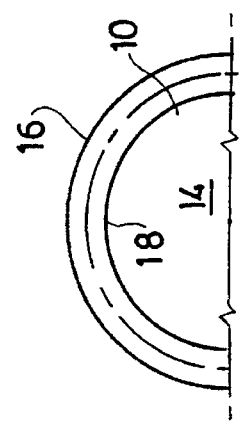
FIGS. 1 and 2 are, respectively, schematic representations of end and side views of one of a pair of known gear-rolling dies.
Figure 2:
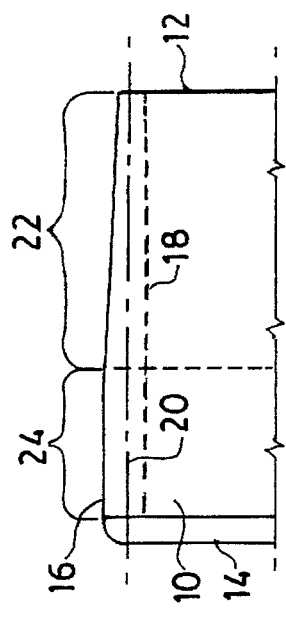

In FIGS. 1 and 2, a gear-rolling die 10 is represented schematically in respective end and side views with the individual gear teeth of the die being omitted. Die 10 is one of a pair of identical dies (the other is not shown) used to roll teeth into a rod-type workpiece. Die 10 has a front or "entry" end 12 and a rear or "exit" end 14, and the surface of die 10 has a plurality of gear teeth (not shown) formed with progressively-increasing profile depth as indicated schematically in exaggerated form by top land line 16, root line 18, and pitch line 20.

Each die 10 is positioned in proximity to its identical paired mating die gear, and a workpiece is fed between the die pair, entering at front end 12 as a rod and exiting at rear end 14 with roll-formed teeth. Each die 10 has a tapered lead portion 22 in which the die teeth penetrate progressively deeper from front end 12 toward rear end 14, followed by a dwell portion 24 in which the depth and profile of the die teeth are (a) substantially identical to the geometry of the desired workpiece gear teeth and remain (b) substantially constant.

Figure 3:
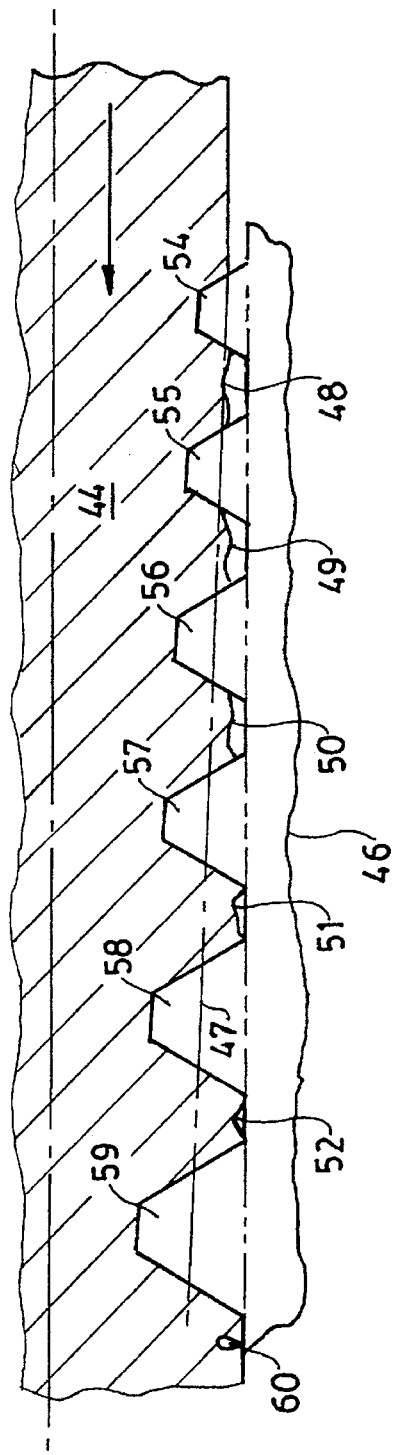
FIG. 3 is a schematic cross-sectional view of a workpiece rod being formed with teeth by a well-known prior art gear-rolling die.

FIG. 3 illustrates, schematically, a cross-sectional view of a workpiece rod 44 being formed with teeth by the start portion of a conventional prior art gear-rolling die 46 which includes a plurality of die teeth having tooth profiles designed with (i) pressure angles substantially equivalent to the pressure angles desired for the teeth being formed in the workpiece and (ii) respective working depths that progressively increase from right-to-left in the drawing. The variably-dashed line 47 represents the line of contact between the imaginary pitch cylinders of gear workpiece 44 and gear die 46.

As can be seen from the top lands 48, 49, 50, 51, and 52 of the successive teeth being formed in workpiece rod 44, the forces exerted by the dies cause the radially outward movement of the metal of rod 44 to be faster along the faces of each respective die tooth 54, 55, 56, 57, 58, and 59 than is its movement nearer the center of the space between each die tooth. Due to this uneven rate of movement, the top lands 50 and 51 have noticeable depressions that increase in steepness significantly at top land 52 and that ultimately come together to create a fissure 60 in the top land of the fully-formed tooth.

Such rolling operations comprise the initial steps in the manufacture of our gears. However, according to our invention, the diameter of the top land of each roll-formed tooth is slightly greater than the cylindrical outside diameter desired for the final gear, and the roll-forming operation is continued until the fissure is narrowed to form a seam at the top land surface of each tooth. Then this initial rolling operation is followed by further processing which is directed to re-opening the fissure in each top land and to forming the top lands of the gear teeth with a cylindrical outside diameter that serves as a journal for the gear. While this further processing may be carried out by one or more of several different machining procedures, the preferred method is a centerless grinding operation of short duration, as is explained in greater detail below.

FIG. 4A is a schematic illustration of a roll-formed tooth 70, showing a fissure 72 closed by a seam 74 in the top land 76 of tooth 70. [NOTE: Persons skilled in the art will understand that the differences between the relative widths of fissure 72 and seam 74 have been greatly exaggerated in the drawings and that, in actual practice, the actual width of fissure 72 will in some cases be only slightly greater than the width of seam 74 at the top land surface.] It is assumed that tooth 70 has not been processed according to the invention. That is, top land surface 76 has not been specially formed to serve as a cylindrical journal surface. As indicated above, in roll-formed tooth 70, the combination of fissure 72 and seam 74 creates a potential weak spot that can cause a failure of the formed tooth under certain types of heavy loading. FIG. 4B is a schematic illustration of a modality for such a failure.

In FIG. 4B, gear tooth 70 is shown at one instant when it is running under load in mesh with a mating gear (not shown) in a differential. It is the HPSTL (i.e., "high point single tooth loading") that is occurring at the instant illustrated. The HPSTL occurs at the intersection of the tooth addendum and the top land and is indicated by normal force arrow 78 which represents the normal force experienced when this point on the profile of tooth 70 is in contact with its mating gear.

Because the HPSTL is so high on the tooth profile, this loading is directed into fissure 72 above its lowest point (i.e., above fissure bottom 73) creating a moment about bottom 73. This moment causes top land portions 76a and 76b to move relative to each other in the manner indicated in dashed lines. Namely, the surface region of top land 76 moves to the left so that the upper walls of fissure 72 move toward the position indicated by dashed lines 72a, while seam 74 moves to the position indicated by dashed lines 74b. Seam 74b acts as a fault line along which top land portion 76a moves downwardly while top land portion 76b moves in a relative upward direction. Of course, as gear tooth 70 rotates with its mating gear during differential operation, the load upon it is constantly changing and top land portions 76a and 76b are accordingly moved between the relative positions shown in solid and dashed lines. Under the stress of these movements, a crack 80 propagates from the left side wall of fissure 72 until failure occurs.

FIG. 5A is a schematic illustration similar to FIG. 4A. However, in this example, the roll-forming process has intentionally created the top land 76' according to the invention, namely, with an outside diameter slightly larger (greatly exaggerated in this schematic) than the cylindrical outside diameter 82 desired for the final form of the gear.

FIG. 5B shows gear tooth 70' after it has been machined further according to the invention, preferably, on a centerless grinder. As can be seen in FIG. 5B, top land 76' has been ground to completely remove seam 74' and to open fissure 72'. Also, it will be noted that the finished grind has provided gear tooth 70' with a new journal/top land 76a' and 76b' which has a cylindrical curvature 82 selected so that the gear has a finished outside diameter that is only slightly smaller than the diameter of the inside cylindrical bearing surface 84 of its intended mating housing pocket.

Once again, it is emphasized that the schematic illustrations of FIGS. 4A, 4B, 5A, and 5B show these various elements in greatly exaggerated dimensions and not in relative scale. For instance, specific reference is made (i) to the total depth of fissure 72' and seam 74', as indicated by the dimension x in FIG. 5A, and (ii) to the final depth of open fissure 72' in FIG. 5B, as represented by the dimension y. In actual practice, in a roll-formed gear having an outside dimension of approximately 30 millimeters (1.2 inches), the total fissure depth x generally ranges between 0.5–1.0 mm (0.02–0.04 inches); and the final open fissure y would be expected to vary between 0.2–0.5 mm (.0.01–0.02 inches). That is, the finish grind of the invention intentionally removes approximately one-half the depth of fissure 72' and seam 74'.

In addition to removing seam 74' and opening fissure 72', as indicated in FIG. 5B, the preferred finishing grind of the invention also lowers the position of HPSTL as indicated by normal force arrow 78'. It can be seen that the invention's slight reduction in the height of top land 76'(i.e., to finish ground journal/top land 76a' and 76b') causes the HPSTL normal to be directed below the bottom 73' of fissure 72'. Therefore, the HPSTL normal does not create any moment about fissure bottom 72a, minimizing any undesirable movement of top land portion 76a' relative to top land portion 76b'. Also, with the invention's modification of gear tooth 70', in the event that some relative movement of top land 76a' does occur, that movement will be absorbed by fissure 72' and will not be transferred to top land 76b'. Of course, in some instances, the finish grinding of top land 76' may result in the removal of fissure 72' as well as seam 74'.

Figure 6:
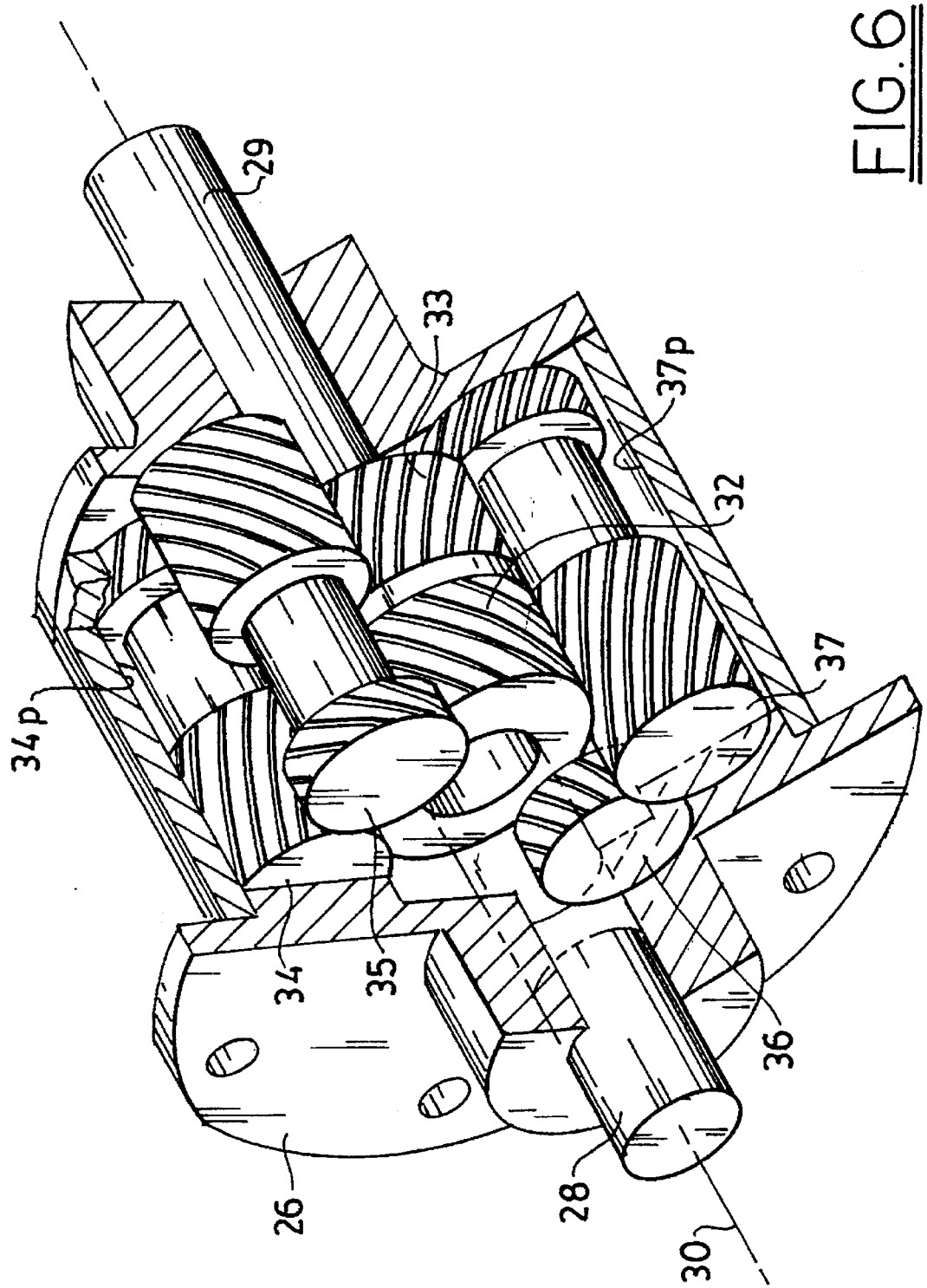
FIG. 6 is a schematic cut-away perspective drawing of a parallel-axis differential according to the invention, showing the planet gears housed in pockets (but omitting details of the gear teeth for clarity).

FIG. 6 shows a parallel-axis differential which includes gears according to our invention (however, details of the top lands of the gear teeth are omitted for sake of clarity). In a housing 26, which is rotatable about a common axis 30, first and second output shafts 28, 29 are also rotatable about common axis 30. A pair of side gears 32, 33 are coupled, respectively, to the inner ends of output shafts 28, 29. Pairs of planet gears 34, 35 and 36, 37 interconnect the side gears 32, 33 for rotation in opposite directions, and each planet gear is received and supported within its own respective housing pocket 34p, 37p. As explained above, the top lands of each planet gear 34-37 act as journals for the gears, and the respective housing pockets are formed with predetermined cylindrical inside diameters for acting as respective bearing surfaces for rotatively mounting the outside journal surfaces of the gears.

Figure 7:
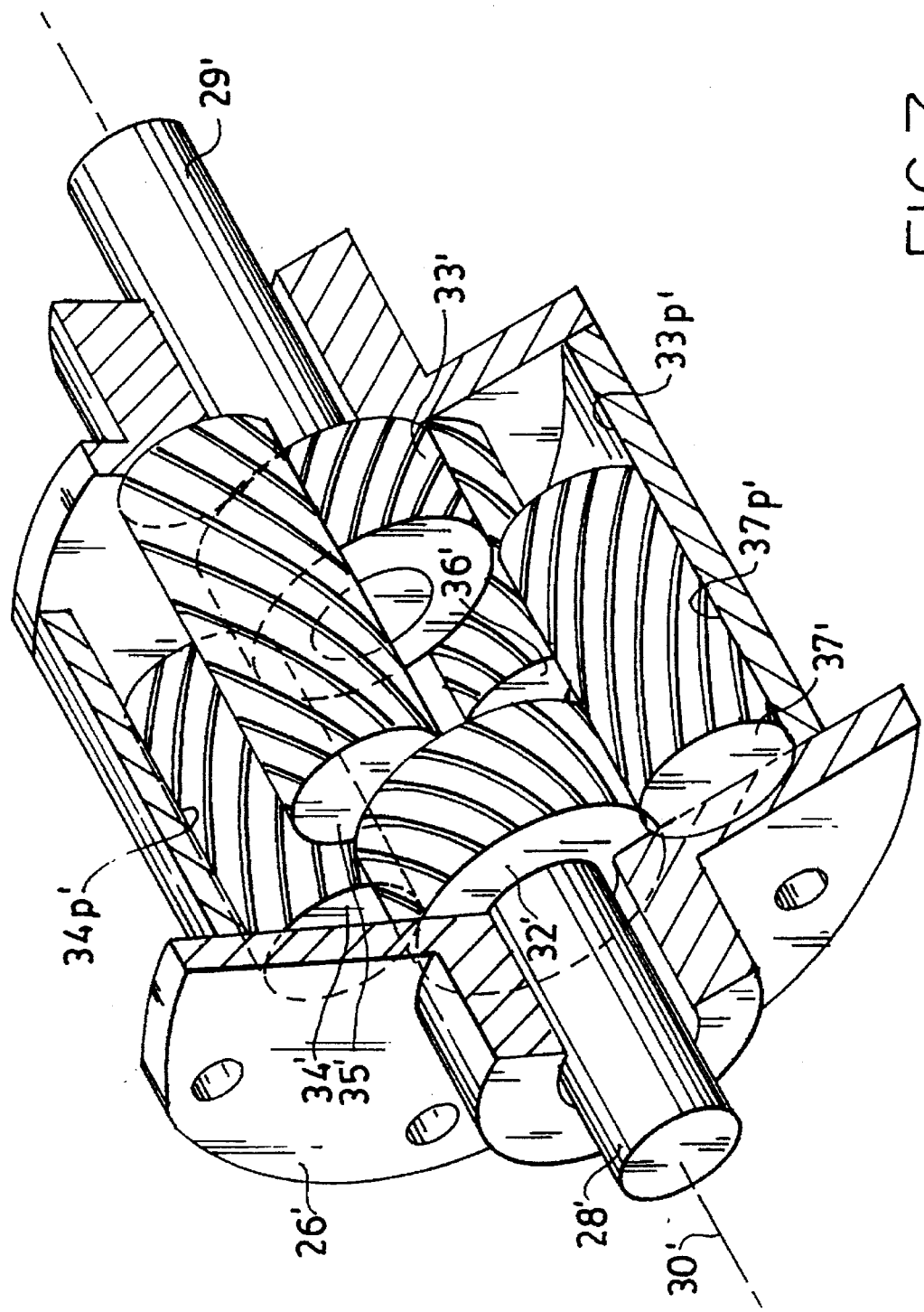
FIG. 7 is a schematic cut-away perspective drawing of another parallel-axis differential according to the invention, showing the side and planet gears housed in pockets (but, again, omitting details of the gear teeth for clarity).

FIG. 7 shows another parallel-axis differential which includes gears according to our invention (however, as in FIG. 6, details of the top lands of the gear teeth are omitted for sake of clarity). In a housing 26', which is rotatable about a common axis 30', first and second output shafts 28', 29' are also rotatable about common axis 30'. A pair of side gears 32', 33' are received and supported in the housing, each within its own respective pocket (e.g., 33p'); and each side gear is coupled, respectively, to the inner end of one of the output shafts 28', 29'. Pairs of planet gears 34', 35' and 36', 37' interconnect the side gears 32', 33' for rotation in opposite directions; and each planet gear is also received and supported within its own respective housing pocket 34p', 37p'. As explained above, the top lands of the gears act as journals for the gears, and each respective housing pocket is formed with a predetermined cylindrical inside diameter for acting as a bearing surface for rotatively mounting the outside journal surfaces of the gears.

We claim:

1. A gear used in a differential having a pocket with a predetermined cylindrical inside diameter that receives and acts as a bearing surface for said gear, said gear comprising:

teeth roll-formed in a cylindrical rod workpiece between toothed dies, the surface of said workpiece having been squeezed radially along the die teeth so that a respective fissure is formed in the top land of each rolled tooth of said gear, each said fissure having been narrowed to form a seam at the top land surface of each tooth and having a depth measured from a fissure bottom to said seam at said top land surface; and the top lands of the teeth having been machined (a) with a cylindrical outside diameter that acts as a journal for said gear and is dimensioned to be received in a mating relationship within said predetermined cylindrical inside diameter of said differential pocket and (b) so that said seam at the top land surface of each tooth is removed and each respective fissure is opened to expose said fissure bottom.

2. The differential gear of claim 1 wherein said open fissure at the top land surface of each tooth has a depth equivalent to approximately one-half said measured fissure depth.

3. The differential gear of claim 1 wherein said cylindrical outside diameter of the teeth is formed so that a normal tooth force vector occurring at the intersection of the addendum and top land surfaces of each respective tooth is directed below the bottom of the respective fissure in the top land of said tooth.

4. In a gear differential interconnecting first and second output shafts rotatable about a common axis, said differential having:

a housing rotatable about said common axis;

first and second side gears positioned within said housing for being coupled, respectively, to inner ends of said first and second output shafts;

planet gears interconnecting said first and second side gears for rotation in opposite directions; and at least one of said side and planet gears being mounted in a pocket formed in said housing with a predetermined cylindrical inside diameter that receives and acts as a bearing surface to rotatively mount the outside diameter surfaces of said one gear;

the improvement wherein said one gear comprises:

teeth roll-formed in a cylindrical rod workpiece between toothed dies, the surface of said workpiece having been squeezed radially along the die teeth so that a respective fissure is formed in the top land of each rolled tooth of said gear, each said fissure having been narrowed to form a seam at the top land surface of each tooth and having a depth measured from a fissure bottom to said seam at said top land surface; and the top lands of the teeth having been machined (a) with a cylindrical outside diameter that acts as a journal for said gear and (b) so that said seam at the top land surface of each tooth is removed and each respective fissure is opened to expose said fissure bottom.

5. The differential of claim 4 wherein said one gear is a planet gear and said pocket receives and supports said planet gear for rotation about an axis that extends parallel to said common axis.

6. The differential of claim 4 wherein said cylindrical outside diameter of said one gear is dimensioned to be received in a mating relationship within said predetermined cylindrical inside diameter of said differential pocket.

7. The differential gear of claim 4 wherein said open fissure at the top land surface of each tooth of said one gear has a depth equivalent to approximately one-half said measured fissure depth.

8. The differential gear of claim 4 wherein said cylindrical outside diameter of said one gear is formed so that a normal tooth force vector occurring at the intersection of the addendum and top land surfaces of each respective tooth of said one gear is directed below the bottom of the respective fissure in the top land of said tooth.

9. A gear used in a differential having a pocket with a predetermined cylindrical inside diameter for receiving and acting as a bearing surface for said gear, said gear comprising:

teeth roll-formed in a cylindrical rod workpiece between toothed dies, the surface of said workpiece having been squeezed radially along the die teeth so that a respective fissure is formed in the top land of each rolled tooth of said gear, each said fissure having been narrowed to form a seam at the top land surface of each tooth and having a depth measured from a fissure bottom to said seam at said top land surface; and the top lands of the teeth having been machined (a) with a cylindrical outside diameter that acts as a journal for said gear and is dimensioned to be received in a mating relationship within said predetermined cylindrical inside diameter of said differential pocket, and (b) so that a portion of each said respective fissure remains formed at the top land surface of each tooth.

10. The differential gear of claim 9 wherein said cylindrical outside diameter of the teeth is formed so that a normal tooth force vector occurring at the intersection of the addendum and top land surfaces of each respective tooth is directed below the bottom of said respective fissure in the top land of said tooth.

* * * * *